United States Patent [19]

Hur et al.

[11] Patent Number: 5,686,651
[45] Date of Patent: Nov. 11, 1997

[54] METHOD FOR MEASURING VEHICLE MOTION RESISTANCES USING SHORT DISTANCE COAST-DOWN TEST BASED ON THE DISTANCE-TIME DATA

[75] Inventors: Nahmkeon Hur; Ieeki Ahn, both of Seoul, Rep. of Korea; Vladimir A. Patrushov, Moscow, Russian Federation

[73] Assignee: Korea Institute of Science and Technology, Seoul, Rep. of Korea

[21] Appl. No.: 597,173

[22] Filed: Feb. 6, 1996

[30] Foreign Application Priority Data

Feb. 10, 1995 [KR] Rep. of Korea ............... 95-2399

[51] Int. Cl.$^6$ ............................................. G01N 3/56
[52] U.S. Cl. .................................................... 73/9
[58] Field of Search ......................... 73/9, 147, 117, 73/117.1; 364/425, 506

[56] References Cited

U.S. PATENT DOCUMENTS

| 4,003,241 | 1/1977 | Thomas | 73/9 |
|---|---|---|---|
| 5,101,660 | 4/1992 | La Belle | 73/117 |

FOREIGN PATENT DOCUMENTS

| 42 26 749 A1 | 2/1994 | Germany. |
|---|---|---|
| 42 28 413 A1 | 3/1994 | Germany. |
| 43 25 413 A1 | 2/1995 | Germany. |

OTHER PUBLICATIONS

Bestimmung der Fahrwiderstände im Fahrversuch (Quantifying Resistance in Road Tests); Automobiltechnische Zeitschrift 86 (1984) 4; Gustav Stask; pp. 175–180.

Road Load Measurement and Dynamometer Simulation Using Coastdown Techniques; Society of Automotive Engineers, Inc.; 1981; C.E. Chapin, General Motors.

Primary Examiner—Robert Raevis
Attorney, Agent, or Firm—Oblon, Spivak, McClelland, Maier & Neustadt, P.C.

[57] ABSTRACT

The present invention is related to a method for measuring vehicle motion resistances using the vehicle coast-down testing method. More specifically, the initial coast-down speed of the vehicle is divided into a low speed range and a high speed range. Each range is tested to obtain physically meaningful test variables for each range. By combining the obtained variables, the length of the test road required for previous coast-down test methods can be significantly reduced. Additionally, vehicle motion resistances may be more accurately measured and analyzed.

4 Claims, 4 Drawing Sheets

METHOD FOR MEASURING VEHICLE MOTION RESISTANCES USING SHORT DISTANCE COAST-DOWN TEST BASED ON THE DISTANCE-TIME DATA

BACKGROUND OF THE INVENTION

1. Field of the Invention

It is well known that vehicle motion resistance consists of the loss resulting from the power transmitting motion of various mechanical parts of the vehicle (hereinafter "transmission loss"), the rolling loss resulting from the friction between each tire and the road surface upon actual driving of the vehicle, and the aerodynamic drag loss resulting from the air flow around the vehicle upon driving, etc.

By analyzing these resistances (or losses), the improvement of the vehicle's fuel consumption and the improvement of characteristics of various driven parts upon the initial concept design or improved design for the vehicle may be greatly aided. Thus, there have been diverse efforts at such research.

2. Description of the Prior Art

In carrying out the above-described research, early efforts usually consisted of simulation performed in a wind tunnel to measure the resistance resulting from the aerodynamic drag loss. Afterwards, studies were conducted to determine the correlation between the aerodynamic drag loss and the rolling loss. Recently, such research efforts have developed to the stage where the data required to determine the aerodynamic drag loss and the rolling resistance loss were acquired from the test and analyzed using the dynamic principles of coast-down vehicular motion. In this previous method, the coast-down vehicular motion data were generally obtained in the form of velocity-time data. However, such data, due to the lack of accuracy of the measuring equipment, etc., were not accurate. Thus, the above data were obtained in the form of distance-time data which are easier to obtain accurately from the test.

However, this distance-time coast-down test required as a test parameter a very long distance from the start of the coast-down motion of the vehicle to the point of a complete stop. Thus, while the necessary testing distance could be varied depending upon the type of vehicle tested, long testing roads of 1.0 km to 2.5 km were generally required to carry out the above test.

Further, the moment when the vehicle came to a complete stop was determined by direct observation, resulting in the possibility of a large error in the measurement of the distance-time data. Additionally, this testing method had the problem of including a low speed range of approximately less than 30 km/h, where the assumption that the aerodynamic drag coefficient is not affected by the vehicle's speed does not apply, thus resulting in a large measurement error.

SUMMARY OF THE INVENTION

The present invention is related to a method for measuring all the vehicle motion resistances using a short distance coast-down test based on distance-time data. More specifically, the initial coast-down speed of a vehicle is divided into a low speed range and a high speed range. Each range is tested once to obtain physically meaningful test variables for each range. By combining the thus obtained variables, the length of the proving ground or test road required by previous coast-down test methods can be significantly reduced. Additionally, vehicle motion resistance can be more accurately measured and analyzed using the method of the present invention.

The object of the present invention is to provide a novel method which solves the above-described problems in the prior art by utilizing an electronic measuring device to collect data required for analysis and to automate the data collection process, omitting the speed range of the test method where the assumption that the aerodynamic drag coefficient is not affected by the vehicle's speed does not apply, enabling more accurate measurement by dividing the initial coast-down speed range into low and high speed ranges and collecting the test data accordingly, and combining and processing the thus obtained data to provide accurate vehicle resistance data.

To accomplish the above object, as shown in FIG. 1, a minute photoelectric sensor, which has almost no effect on the aerodynamic drag coefficient of the vehicle, is attached on the vehicle. Also, a reflection tape, which can reflect the optical signal to said sensor, is affixed at predetermined intervals on the test mad on which the vehicle is moving. Thus, an automated measuring instrument may be used to collect distance-time data at the points where the vehicle passes over each reflection tape.

BRIEF DESCRIPTION OF THE DRAWINGS

The present invention is explained further in detail by referring to the accompanying figures.

PREFERRED EMBODIMENTS OF THE INVENTION

Figure 1:
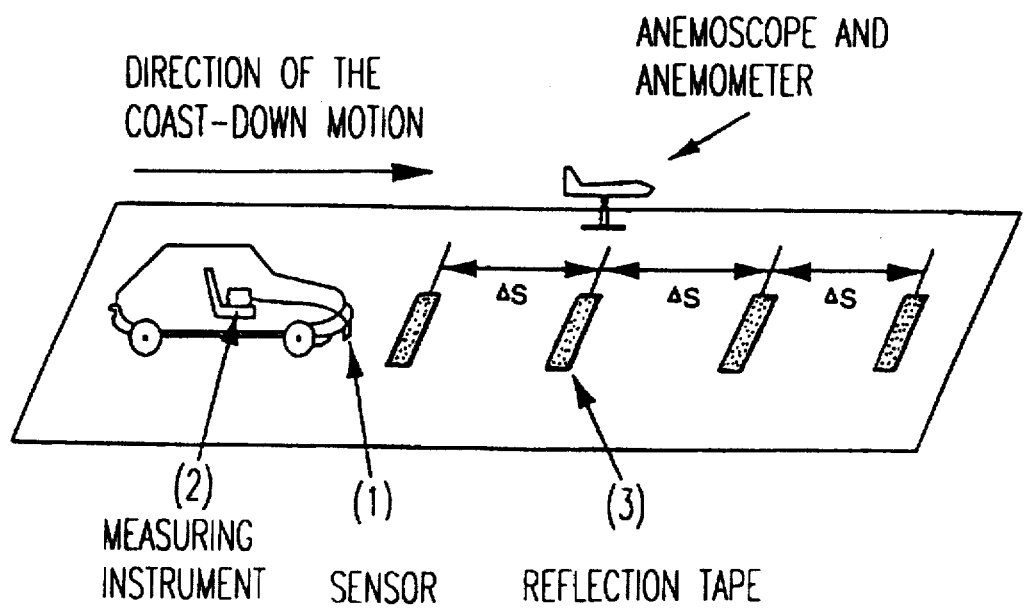
FIG. 1 is a schematic drawing to illustrate the short distance coast-down test method of the present invention.

In a moving vehicle, where the engine power delivered through the drive shaft to the tires has been cut off, and the vehicle does not receive power from the engine and coast-down motion is thus effected, as described above, the speed of the vehicle is reduced due to the rolling resistance loss from the tires, transmission loss, aerodynamic drag loss, etc. and the vehicle eventually comes to a complete stop. To obtain information on such loss, the analytic method as described below is used.

To effectively use distance-time data, a process of mathematically treating the generally known coast-down motion is first explained.

Where the vehicle is in coast-down motion, the following coast-down equation can be obtained by applying Newton's Second Law of Motion.

$$\frac{W}{g}(1+f)\frac{dV}{dt} = D_T + D_R + D_a \qquad (1)$$

Here, $D_T$, $D_R$ and $D_a$ represent transmission loss, rolling resistance loss, and aerodynamic drag loss, respectively. The constants and variables of the equation (1) can be further expressed as follows.

$D_T = W(\tau_0 + bV)$: transmission loss $D_R = W(f_0 + kV^2)$: rolling resistance loss $D_a = C_d(\frac{1}{2}\rho)V^2 F$: aerodynamic drag loss $f = (nI_w + I_d)g/WR^2$ $\tau_0$: coefficient of constant term of the transmission loss b: coefficient of velocity term of the transmission loss $f_0$: coefficient of constant term of the rolling resistance k: coefficient of velocity-squared term of the rolling resistance n: total number of tires $I_w$: moment of inertia of one tire (kg-m$^2$)

$I_d$: moment of inertia of the power transmission portions excluding the tires (kg-m$^2$)

R: dynamic radius of the tires (m)

W: vehicle weight (kg)

V: vehicle speed (m/sec)

F: frontal area of the vehicle (m$^2$)

ρ: air density (kg/m$^3$)

$C_d$: drag coefficient g: gravitational acceleration (m/sec$^2$)

By rearranging said equation (1), the following coast-down equation can be obtained.

$$\frac{\delta}{g} \frac{dV}{dt} = a + bV + cV^2 \quad (2\text{-}1)$$

Here, $\delta = 1+f$, $a = \tau_0 + f_0$, $b = b$, and $c = k + (\rho C_d F)/(2gW)$.

If said equation (2-1) is integrated using the method of separation of variables, the following equation can be obtained for the velocity-time data.

$$\frac{dS(t)}{dt} = V(t) = \frac{\delta}{gc} [B \tan(\tan^{-1}(h/B) + B(T-t)) - h] \quad (3)$$

Here, S(t) is the distance traveled by the vehicle from time 0 (zero) to time t, V(t) is the vehicle speed at time t, t is an arbitrary time during the testing, T is the length of time from arbitrary time t to the time when the vehicle comes to a complete stop, $B = (gA)/(2\delta)$, $A = \sqrt{(4ac - b^2)}$, and $h = (gb)/(2\delta)$.

Likewise, if equation (3) is once again integrated, the following equation can be obtained for the distance-time data.

$$S(t) = \frac{\delta}{gc} \left[ \ln \frac{\cos(\tan^{-1}(h/B))}{\cos(\tan^{-1}(h/B) + BT)} - ht \right] \quad (4)$$

Further, by substituting the relationship of t=T in said equation (4), the following required equation can be obtained.

$$S(T) = \frac{\delta}{gc} \left[ \ln \frac{\cos(\tan^{-1}(h/B))}{\cos(\tan^{-1}(h/B) + BT)} - hT \right] \quad (5)$$

Here, S(T) indicates the distance traveled by the vehicle in coast-down motion from the T to the time when the vehicle comes to a complete stop.

The measured distance-time data can be substituted into the equation (5) to obtain undetermined coefficients a, b, and c of equation (2-1) by a numerical analysis (e.g., curve-fitting method). By using the thus obtained said coefficients, the total time consumed during complete coast-down motion of the vehicle, which is necessary data for conducting performance tests of the vehicle, can be inversely obtained.

Figure 2:
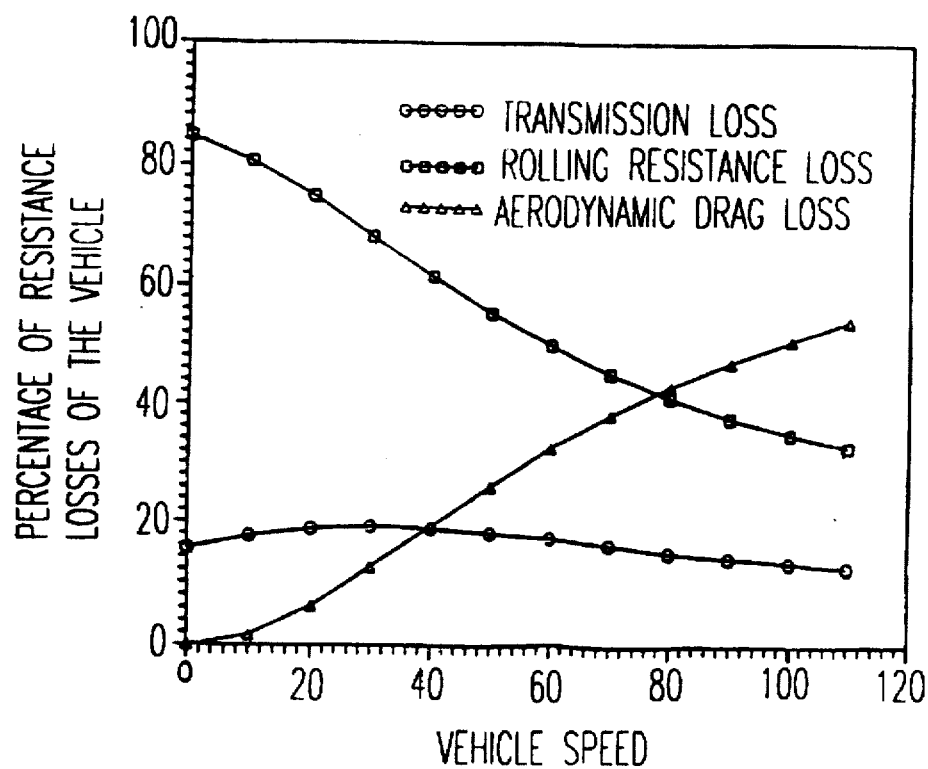
FIG. 2 is a graph showing the percentage of resistances to vehicle speed for a conventional passenger car.

As described above, the coast-down resistance of vehicles may generally be divided into transmission loss, rolling resistance loss, and aerodynamic drag loss. Further, FIG. 2 shows that the transmission loss is relatively small when compared to the other resistances over the overall speed range. The transmission loss is very little affected by actual movement of the vehicle. Thus, the transmission loss is very be tested separately from the other resistances on a test bench to obtain accurate measurement. To do this, the driving tire of the vehicle is lifted from the ground, using a jack, etc., and the coast-down test is conducted on a test bench to separately measure the transmission loss apart from the other resistances.

Returning to equation (2-1), if the coast-down equation is reformulated using only the parameters related to transmission loss, the following equation is obtained.

$$-\frac{\delta_o}{g} \frac{dV}{dt} = \tau_0 + bV \quad (2\text{-}2)$$

Here, the effective mass of the rotating parts is $\delta_o = g(mI_w + I_d)/(WR^2)$ with m denoting the number of driving tires.

As was described above, if equation (2-2) is twice integrated using the method of separation of variables, the following equations (6) and (7), related to the coast-down speed-time data and distance-time data, respectively, can be obtained:

$$\frac{dS(t)}{dt} = V(t) = \frac{\tau_o}{b} [\exp((T-t)h_o) - 1] \quad (6)$$

$$S(t) = \frac{\tau_o}{bh_o} [\exp(Th_o) - \exp((T-t)h_o)] - \frac{\tau_o}{b} t \quad (7)$$

Here, if the relationship t=T is substituted into said equation (7), the following equation (8) is obtained.

$$S(t) = \frac{\tau_o}{b} \left[ \frac{\exp(Th_o) - 1}{h_o} - T \right] \quad (8)$$

Figure 3:
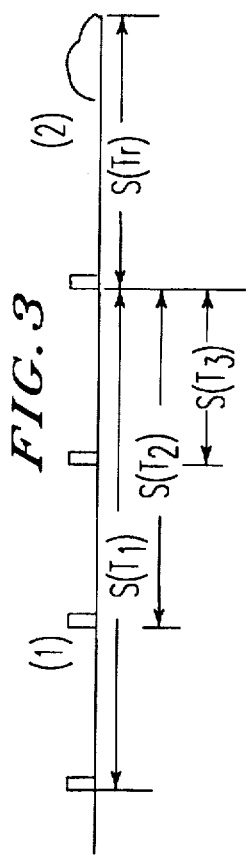
FIG. 3 is a schematic view showing coast-down distances and times used in the short distance coast-down test method.

At this point, the distance-time relationship needed to conduct the short distance coast-down test based on distance-time data of the present invention as defined in FIG. 3, i.e., the relationship capable of excluding the data close to the time when the vehicle comes to a complete stop from the measurement range, can be obtained.

As described above, a more accurate result can be obtained by separately measuring the transmission loss. Thus, if the distance-time relationship as shown in FIG. 3 is substituted into said equation (8) for the transmission loss, the following equation can be obtained.

$$S(T_i) = \frac{\tau_o}{b} \left[ \frac{e^{T_i h_o}(e^{T_r h_o} - 1)}{h_o} - T_i \right] \quad (9)$$

Here, $T_i$ is the time taken for the vehicle to travel from the i-th reflection tape to the last reflection tape, $T_r$ is the time taken from the last reflecting tape for the vehicle to come to a complete stop, and $h_0$ and $\delta_0$ may be expressed with the following equations.

$$h_o = \frac{gb}{\delta_o} \quad \text{and} \quad \delta_o = \frac{(mI_w - I_d)g}{WR^2}$$

After affixing the reflection tape on a tire, the time consumed to pass that point at predetermined rotation intervals and the final passing time of said tire is measured. The coast-down distance can then be easily obtained from the pre-set rotation number and the effective diameter of the tire. If the measured distance-time data is substituted into the equation (9), the following equations may be obtained.

$$2\Delta S + \Delta S^* = \frac{\tau_o}{b} \left[ \frac{e^{T_i h_o}(e^{T_i h_o} - 1)}{h_o} - T_1 \right] \quad (10\text{-}1)$$

-continued $$\Delta S + \Delta S^* = \frac{\tau_o}{b} \left[ \frac{e^{T_r h_o}(e^{T_2 h_o} - 1)}{h_o} - T_2 \right] \quad (10\text{-}2)$$

$$\Delta S^* = \frac{\tau_o}{b} \left[ \frac{e^{T_r h_o}(e^{T_3 h_o} - 1)}{h_o} - T_3 \right] \quad (10\text{-}3)$$

The three variables $\tau_o$, b, $T_r$ can be obtained from the above three equations 10-1, 10-2, 10-3). Among the variables, the value of the undetermined coefficient b is used to obtain the transmission loss, as a constant, under the assumption that it is constant over the coast-down testing period regardless of the speed of a vehicle.

Since the transmission loss is very small as compared to the other resistances, it should be noted that the low speed range must be emphasized in order to obtain an accurate measurement. Although conventional testing methods, as in the testing method of the present invention, also measured the time for the vehicle to come to a complete stop, the present invention automatically acquires necessary data from the number of the tire rotation and time data, unlike the previous methods, for more accurate and reliable measurement.

Next, the rolling resistance and the aerodynamic drag loss of the vehicle will be described on the basis of said testing method.

If the distance-time relationship shown in FIG. 3, which does not include the point where the vehicle comes to a complete stop within the measurement range, is applied to said equation (5), the following short distance coast-down equation can be obtained.

$$S(T_i) = \frac{\delta}{gc} \left[ \ln \frac{\cos(\tan^{-1}(h/B) + BT_r)}{\cos(\tan^{-1}(h/B) + B(T_r + T_i))} - hT_i \right] \quad (11)$$

Here, $T_i$ is the time taken for the vehicle to travel between the i-th reflection tape to the last reflecting tape, and $T_r$ is the time taken for the vehicle travel from the last reflecting tape to the point when the vehicle comes to a complete stop. Additionally, h, B, and A may be expressed as follows.

$$h = (gb)/(2\delta), B = (gA/2\delta), A = \sqrt{4ac - b^2}$$

Now, one of the most important concepts embodied by the present invention should be added.

Referring again to FIG. 2, where the vehicle speed is less than 60 km/h, the rolling resistance is relatively larger than the aerodynamic drag loss. However, where the vehicle speed is more than 80 km/h, the aerodynamic drag loss is relatively larger than the rolling resistance. Thus, in order to apply this phenomena to the present invention, coast-down tests for the ranges where the initial coast-down speed is high and low are separately conducted. Since the rolling resistance is relatively large when the initial coast-down speed is low, variable c, which has a close relationship with the aerodynamic drag loss, has insignificant physical meaning and is thus discarded. Thus, only variable a, which has a close relationship with the rolling resistance, is applied. On the contrary, for the high speed coast-down test, variable c is conversely applied, with variable a being discarded. Therefore, it is possible to measure more accurate motion resistance of the vehicle by taking each meaningful variable from each test.

The above process is further explained in detail as follows.

The term "low coast-down speed" here denotes an initial coast-down speed of approximately 60 km/h, where the speed of the vehicle would be about 35 km/h after undergoing 600 m of coast-down motion, for example.

Since coefficient b has already been obtained from the above-mentioned transmission loss testing, the low coast-down speed test is first conducted to measure the distance-time data at the points shown in FIG. 1. Once this data is substituted in said equation (11), the following three equations can be obtained.

$$3\Delta S = \frac{\delta}{gc} \left[ \ln \frac{\cos(\tan^{-1}(h/B) + BT_r)}{\cos(\tan^{-1}(h/B) + B(T_r + T_1))} - hT_1 \right] \quad (12\text{-}1)$$

$$2\Delta S = \frac{\delta}{gc} \left[ \ln \frac{\cos(\tan^{-1}(h/B) + BT_r)}{\cos(\tan^{-1}(h/B) + B(T_r + T_2))} - hT_2 \right] \quad (12\text{-}2)$$

$$\Delta S = \frac{\delta}{gc} \left[ \ln \frac{\cos(\tan^{-1}(h/B) + BT_r)}{\cos(\tan^{-1}(h/B) + B(T_r + T_3))} - hT_3 \right] \quad (12\text{-}3)$$

Thus, the above three equations (12-1, 12-2, 12-3) may be solved to obtain variables a, c, and $T_r$. As discussed above, only the value a is meaningful among the calculated variable values. Thus, only the value a is chosen and used in the following steps.

As the value of variable c must now be determined, high speed coast-down testing, is conducted to obtain distance-time data. This data is similarly applied said equation (11) to obtain the following equations.

$$3\Delta S = \frac{\delta}{gc} \left[ \ln \frac{\cos(\tan^{-1}(h/B) + BT_r)}{\cos(\tan^{-1}(h/B) + B(T_r + T_1))} - hT_1 \right] \quad (13\text{-}1)$$

$$\Delta S = \frac{\delta}{gc} \left[ \ln \frac{\cos(\tan^{-1}(h/B) + BT_r)}{\cos(\tan^{-1}(h/B) + B(T_r + T_3))} - hT_3 \right] \quad (13\text{-}2)$$

Values for variables c and $T_r$ can be obtained from said equations (13-1, 13-2). Thus, all of the variables (or undetermined coefficients) related to the motion resistance of the vehicle can be obtained.

To verify the feasibility of the testing method according to the present invention, the coast-down distance-time data for a passenger car was measured using a laser measuring instrument for the coast-down testing and was tabulated in Table 1. To apply this data to the improved coast-down equation (11) set forth by the present invention, $S(T_1)$, $S(T_2)$, and $S(T_3)$, were set as 600 m, 400 m, 200 m, respectively, as shown in FIG. 3. Five sets of data groups may thus be obtained, as shown by Table 2.

Figure 4:
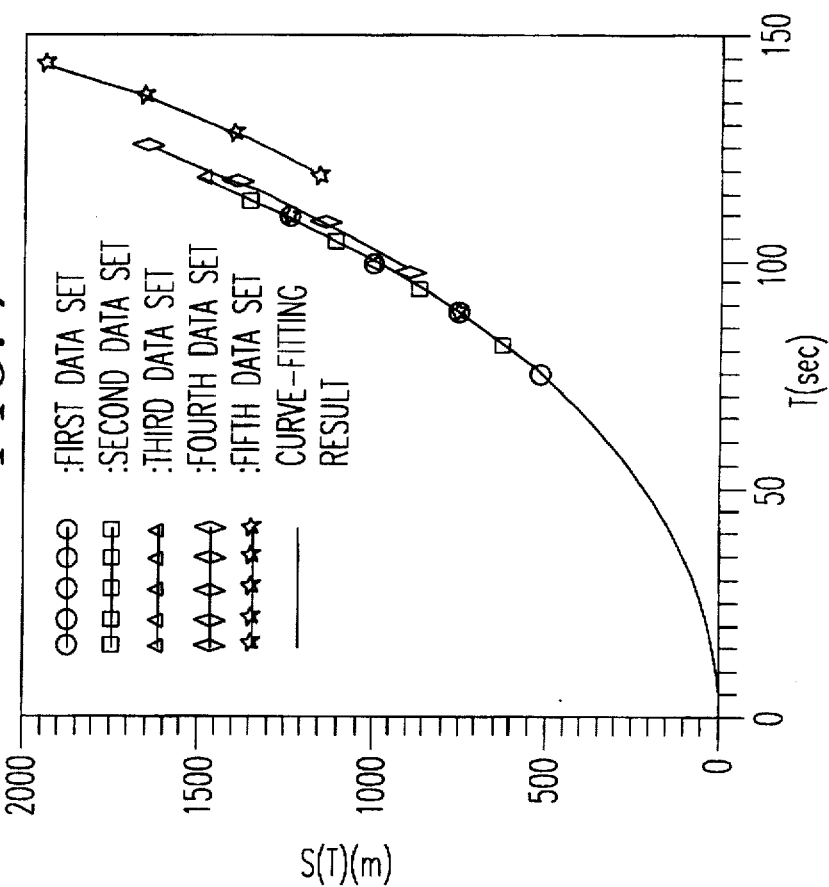
FIG. 4 is a graph showing the results of the test method according to an embodiment of the present invention.

On the other hand, if said data is obtained without being divided into a low speed and a high speed range and is simply treated with the distance-time short distance coast-down equation (11) of the present invention, the results as shown in FIG. 4 are obtained. Referring to FIG. 4, the data obtained from relatively long measurement ranges, e.g., the range between 1000 m and 800 m, are correlated on one curve; the data obtained from relatively short measurement ranges, e.g., the range below 600 m distance, are rather scattered. Thus, it can be seen that it gives inaccurate results to reduce the measurement range of the coast-down test any further so long as the conventional method is applied.

Figure 5:
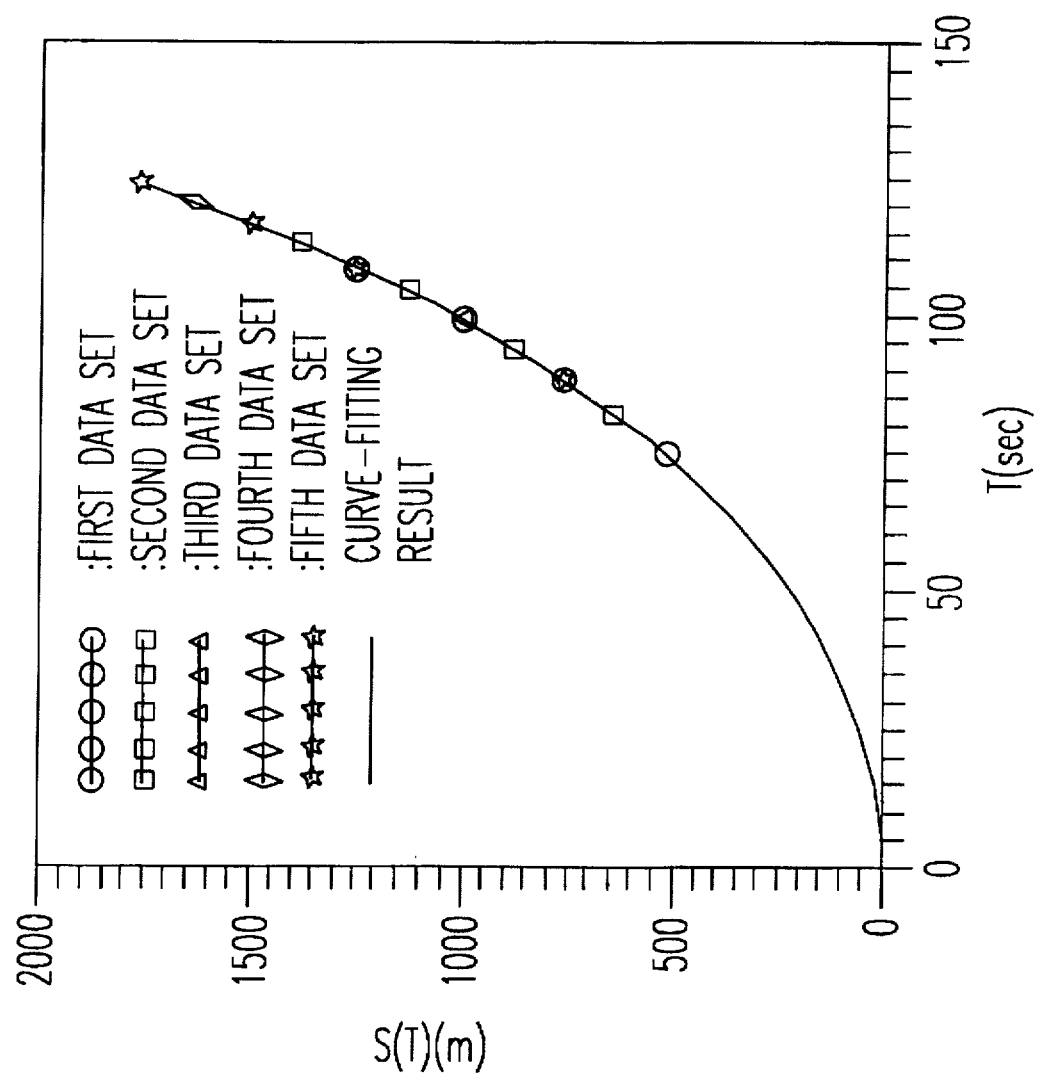
FIG. 5 is a graph showing the results of the test method according to another embodiment of the present invention.

In the present invention, for obtaining variable a, which is related to the rolling resistance, said equations (12-1, 12-2, 12-3) are used since they concern the low speed ranges where the rolling resistance is dominant. Similarly, for obtaining variable c, related to the aerodynamic drag loss, said equations (13-1, 13-2) are used since they concern the high speed ranges where the aerodynamic drag loss is dominant. The results obtained according to the above main concept of the present invention are shown in FIG. 5. From this Figure, it can be seen that all of the test data are well correlated on one curve. This indicates that the method of the present invention, which can separately use the test data obtained from individual low and high speed ranges, is valid and advantageous.

TABLE 1

Coast-down distance and coast-down time of the test vehicle
(These data were measured using a laser measuring instrument
for coast-down testing)

| S (m) | t (sec) | S (m) | t (sec) |
|---|---|---|---|
| 100 | 3.651 | 600 | 25.992 |
| 200 | 7.546 | 700 | 31.544 |
| 300 | 11.692 | 800 | 37.614 |
| 400 | 16.123 | 900 | 44.323 |
| 500 | 20.873 | 1000 | 51.839 |

TABLE 2

Coast-down times for the 600 m, 400 m, 200 m ranges
(These data were obtained from Table 1)

| N | 1 | 2 | 3 | 4 | 5 |
|---|---|---|---|---|---|
| T1 | 35.716 | 32.631 | 30.068 | 27.893 | 25.992 |
| T2 | 25.847 | 23.450 | 21.491 | 19.852 | 18.446 |
| T3 | 14.225 | 12.779 | 11.622 | 10.671 | 9.869 |

As a final matter, the measuring instruments for use in the present invention and the equipment for processing the data obtained from said instruments are discussed.

Figure 6:
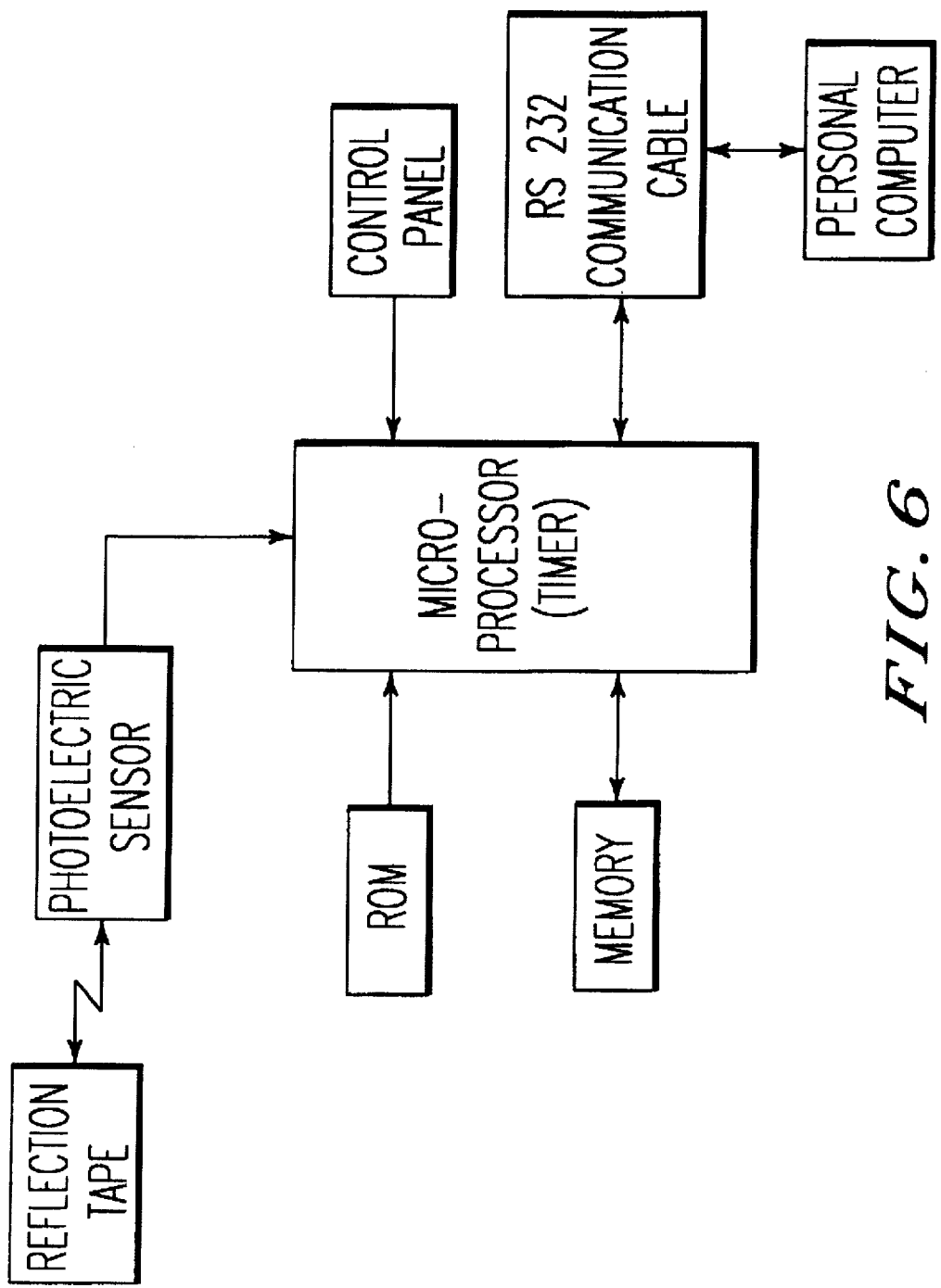
FIG. 6 is a functional block diagram of the measuring instruments used in carrying out the test method of the present invention.

Reflection tape responsive to the photoelectric sensor is affixed to the points of the test road at which measurement is desired. Further, a small photoelectric sensor is mounted on the vehicle, e.g., on the number plate of the vehicle. Thus, each time the vehicle passes over the tape, an electric pulse signal is produced. (See FIG. 1.) FIG. 6 shows schematically the system for treating and processing said signals. A microprocessor is used to convert this electric signal into time intervals between the reflection tape-affixed points. These intervals are stored in the memory of the measuring instrument and are transferred to a personal computer. This transferred data is used so that the test results can be calculated and displayed once the vehicle-related data, i.e., frontal area of the vehicle, vehicle weight, the various moments of inertia, etc., are input. To measure said time intervals, an internal clock within the microprocessor is interrupted at each predetermined time. The number of said interruptions are then counted. Alternatively, the pulse number of an external clock may be read by a counter with this being then read by a microprocessor to measure said time intervals.

What is claimed is:

1. A method for measuring total motion resistances of a motor vehicle, wherein the resistances are comprised of transmission loss, rolling loss and aerodynamic loss, comprising:

(a) raising the vehicle from the ground;
    (b) applying power from a vehicle engine to cause a driving wheel of the vehicle to rotate;
    (c) stopping the power applied to the driving wheel thereby allowing the driving wheel to freely rotate;
    (d) acquiring a first set of distance-time data from the rotation intervals of the driving wheel;
    (e) determining at least three measuring points on a vehicle coast-down test road, wherein the measuring points are determined prior to a point at which the vehicle comes to a rest;
    (f) allowing the vehicle to coast-down the test road with an initial vehicle velocity $V_i$;
    (g) acquiring a second set of distance-time data as the vehicle passes the measuring points during coast-down;
    (h) determining the total resistances of the vehicle in accordance with $$(\rho/g)(dV/dt) = a + bV + cV^2$$

where $\rho$ is air density, V is vehicle velocity, g is gravitational acceleration, a is a coefficient relating to rolling and transmission loss, b is a coefficient relating to transmission loss, and c is a coefficient relating to aerodynamic and rolling loss; and coefficient b is determined from the first set of distance-time data in accordance with:

$$S(T_i) = \frac{\tau_o}{b}\left[\frac{e^{T_i h_o}(e^{T_i h_o}-1)}{h_o} - T_i\right]$$

and coefficients a and c are determined from the second set of distance-time data in accordance with:

$$S(T_i) = \frac{\delta}{gc}\left[\ln\frac{\cos(\tan^{-1}(h/B)+BT_r)}{\cos(\tan^{-1}(h/B)+B(T_r+T_i))} - hT_i\right]$$

where $T_i$ is the time taken for said vehicle to travel between an i-th measuring point to a final measuring point among the predetermined points on a test road and $T_1$ is the time taken for the vehicle to come to a complete stop from the final measuring point; and $h = (gb)/(2\delta)$, $h_o = gb/\delta_o$, $B = (gA/2\delta)$, $h = (gb)/(2\delta)$, $h_0 = gb/\delta_0$, $B = (gA/2\delta)$, $A = \sqrt{(4ac-b^2)}$, $\delta = 1 + f = 1 + \{(nI_W + I_d)g/WR^2\}$,
$\delta_0 = (MI_W + I_d)g/(WR^2)$,
$a = \tau_0 + f_0$
$c = k = (\rho C_d F)/(2gW)$; and where $\tau_0$ is a constant term of transmission loss, $f_0$ is a constant term of rolling resistance, k is a coefficient of rolling resistance proportional to the square of the vehicle velocity, n is total number of the wheels, m is number of the driving wheels, $I_W$ is moment of inertia of one wheel, $I_d$ is moment of inertia of transmission excluding the wheels, R is dynamic radius of the wheels, W is vehicle weight, F is frontal area of the vehicle, and $C_d$ is drag coefficient.

2. The method for measuring total motion resistances of a vehicle according to claim 1, wherein the $V_i$ of step (f) comprises a low initial velocity $V_{iL}$ and a high initial velocity $V_{iH}$; the second set of distance-time data of step (g) is acquired for $V_{iL}$ and $V_{iH}$ as the vehicle passes the measuring points during coast-down; and the total resistances of the vehicle are determined in step (h) in accordance with:

$$(\rho/g)(dV/dt) = a_L + bV + C_{HL}V^2,$$

where $a_{iL}$ is a coefficient calculated from the second set of distance-time data of step (g) when the initial velocity is $V_{iL}$, and $C_{iH}$ is a coefficient calculated from the second set of distance-time data of step (g) when the initial vehicle velocity is $V_{iH}$.

3. The method for measuring total motion resistance of a vehicle according to claim 1, wherein step (a) further comprises affixing first reflection means on the driving wheel of the vehicle and mounting first sensing means at a position near the driving wheel; and step (e) further comprises affixing second reflection means onto the determined points and mounting second sensing means on the vehicle.

4. The method for measuring total motion resistance of a vehicle according to claim 2, wherein step (a) further comprises affixing first reflection means on the driving wheel of the vehicle and mounting first sensing means at a position near the driving wheel; and step (e) further comprises affixing second reflection means onto the determined points and mounting second sensing means on the vehicle.

* * * * *